US009231951B2

(12) United States Patent
Roskind (10) Patent No.: US 9,231,951 B2
(45) Date of Patent: Jan. 5, 2016

(54) PROBABILISTICALLY EXPEDITED SECURE CONNECTIONS VIA CONNECTION PARAMETER REUSE

(71) Applicant: Google Inc., Mountain View, CA (US)

(72) Inventor: James Anthony Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 7 days.

(21) Appl. No.: 14/076,057

(22) Filed: Nov. 8, 2013

(65) Prior Publication Data

US 2015/0128229 A1 May 7, 2015

Related U.S. Application Data

(60) Provisional application No. 61/899,102, filed on Nov. 1, 2013.

(51) Int. Cl.
*H04L 29/06* (2006.01)
(52) U.S. Cl.
CPC ............... *H04L 63/10* (2013.01); *H04L 63/08* (2013.01); *H04L 63/0876* (2013.01)
(58) Field of Classification Search
None
See application file for complete search history.

(56) References Cited

U.S. PATENT DOCUMENTS

| 6,064,736 A * | 5/2000 | Davis et al. ................... 713/155 |
| 8,103,770 B1 * | 1/2012 | Masters ........................ 709/225 |
| 8,326,920 B1 | 12/2012 | Modadugu et al. |
| 2001/0009025 A1 * | 7/2001 | Ahonen ........................ 713/161 |
| 2003/0233452 A1 * | 12/2003 | Maufer et al. ................. 709/225 |
| 2007/0124489 A1 | 5/2007 | Swander et al. |
| 2008/0228931 A1 | 9/2008 | Pancholi et al. |
| 2009/0292925 A1 * | 11/2009 | Meisel .......................... 713/176 |
| 2012/0310980 A1 | 12/2012 | Hepper |
| 2013/0046864 A1 | 2/2013 | Behringer et al. |

OTHER PUBLICATIONS

Langley Transport Layer Security (TLS) Snap Start Jun. 18, 2010 IETF Internet Draft pp. 1-22.*

* cited by examiner

*Primary Examiner* — David Pearson
(74) *Attorney, Agent, or Firm* — McDermott Will & Emery LLP (57) ABSTRACT

Methods for probabilistically expediting secure connections via connection parameter reuse are provided. In one aspect, a method includes determining whether a client had previously established a secure connection with a hostname. The method also includes obtaining a source identifier used by the client to establish the previous secure connection when it is determined that the client previously established the previous secure connection with the hostname. The method also includes sending a request to the hostname for a new secure connection based on the obtained source identifier. Systems and machine-readable media are also provided.

18 Claims, 5 Drawing Sheets

PROBABILISTICALLY EXPEDITED SECURE CONNECTIONS VIA CONNECTION PARAMETER REUSE

CROSS-REFERENCE TO RELATED APPLICATIONS

The present application claims the benefit of U.S. Provisional Patent Application Ser. No. 61/899,102, entitled "Probabilistically Expedited Secure Connections Via Connection Parameter Reuse," filed on Nov. 1, 2013, which is hereby incorporated by reference in its entirety for all purposes.

BACKGROUND

1. Field

The present disclosure generally relates to the transmission of data over a network, and more particularly to the connection of a computing device with another computing device.

2. Description of the Related Art

It is desirable to establish a connection, such as an internet connection, with the lowest latency possible. Lower latency results in a better user experience. However, when establishing a secure connection, round trips of communication may be required. These additional round trips cause latency to increase, and accordingly, user experience decreases.

SUMMARY

According to one embodiment of the present disclosure, a computer-implemented method for probabilistically expediting secure connections via connection parameter reuse is provided. The method includes determining whether a client had previously established a secure connection with a hostname. When it is determined that the client had previously established the secure connection with the hostname, the method includes obtaining a source identifier used by the client to establish the previous secure connection. The method also includes sending a request to the hostname for a new secure connection based on the obtained source identifier.

According to one embodiment of the present disclosure, a client system for probabilistically expediting secure connections via connection parameter reuse is provided. The system includes a memory storing executable instructions and a source identifier cache and a processor configured to execute the executable instructions stored in the memory to determine whether the client system had previously established a secure connection with a hostname. When it is determined that the client system had previously established a previous secure connection with the hostname, the processor is also configured to execute the executable instructions stored in the memory to obtain a source identifier used by the client system to establish the previous secure connection from the source identifier cache. The processor is also configured to execute the executable instructions stored in the memory to send a request to the hostname for a new secure connection based on the obtained source identifier.

According to one embodiment of the present disclosure, a non-transitory machine-readable medium embodying instructions is provided. These instructions, when executed by a machine, allow the machine to perform a method. The method includes generating a source identifier using a hash function. The method includes sending a request to a hostname for a new secure connection using the generated source identifier.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed application determines whether a client had previously established a secure connection with a hostname, such as a connection via the QUIC protocol. If the client had previously established a secure connection with a hostname, the client obtains a previously used source identifier (e.g., IP address and a port number, or a QUIC identifier). The client then reuses some or all of the previously used source identifier to contact the hostname. If the client can reach a server it had previously made a connection with, then the client can send authentication information immediately and avoid the multiple trips of communication that increase latency.

In some embodiments, when a client initiates a connection with a hostname, the client randomly chooses a source IP address and port. A NAT (Network Address Translation) proxy may translate this source IP address and port into a more globally unique IP address and port before connecting to a server. When the client sends a data packet to a hostname, a load balancer performs a pseudo-random assignment and assigns the client's IP address and port to a particular server and a connection is established. When the client initiates connection with the hostname at a later time, a new source port is traditionally used. This commonly results in a new global IP address and port combination provisioned by a NAT, and assignment by a load balancer to a new server, commonly distinct from the original server.

If the client initiates connection re-establishment with the hostname, using a previously used source identifier, it may result in the same NAT translation of the source identifier. Sending the hostname the source identifier with the same NAT translation may result in reaching the previously connected server. The previously connected server may be reached because the load balancer may perform the same pseudo-random assignment as before. As a second example, the client may reuse a specific portion of a QUIC identifier, such as by reusing the prefix or postfix of the previously used QUIC identifier (i.e., the GUID for the connection). The load balancer may perform the same pseudo-random assignment as before. The client sends connection credentials when it attempts to connect to the hostname. If the client is successful in reaching a previously connected server, the server will immediately be able to validate the connection credentials and a secure connection can be established more quickly, such as without having to engage in multiple rounds of communication between the client and the server, or without having to communicate with other servers to validate credentials or preclude replay attacks using credentials. Immediately establishing a secure connection minimizes communication trips between client and server and minimizes latency.

Connection credentials are provided by a server and may be reused at a future time to re-establish connectivity to only that server, or to a restricted set of servers. For example, a client may be given zero round-trip time (0-RTT) connection credentials by a server (for example in QUIC: a source address token STK, and a cryptographic configuration), and the client may reuse the 0-RTT connection credentials to re-establish connectivity to only that server, such as in connection with a nonce, timestamp, or other connection unique data. In another example, with Transport Layer Security (TLS), connection credentials may be issued for session use in SNAP start, or in QUIC, a client may use 0-RTT connection credentials to establish a connection including a global timestamp.

The server may verify a connection and data request is not a replay attack by a third party by validating that a current request was not previously made. A server may validate the current request using a "strike register" that lists all recent requests or hashes of the connection establishment. There may be a plurality of strike registers, including a centralized strike register, for a plurality of servers, but connection speed during a reconnection attempt may be increased if the same strike register, in the server that issued the credentials, is accessed by the client.

For example, if a client presents a server with connection credentials and a data request, the connection may be made if the global timestamp of the connection credentials is within the range of time covered by the strike register. If the client accesses the same server as in a previous secure connection and there is a plurality of strike registers, the same strike register may be accessed, and the hostname may not need to contact a centralized strike register in order to validate the connection request. If the connection is not found within the strike register, the connection is accepted as a unique new connection.

The subject disclosure also provides for generating a source identifier using a hash function and sends a request to a hostname for a new secure connection using the generated source identifier. The source identifier is generated in a way that can be recreated later. The client will not have to store previously used source identifiers, but can regenerate previously used source identifiers by using the same hash function. Because the same source identifier is generated and used, the benefits realized by using a stored, previously used source identifier, as outlined above, are also realized by generating the source identifier using the same hash function each time.

Figure 1:
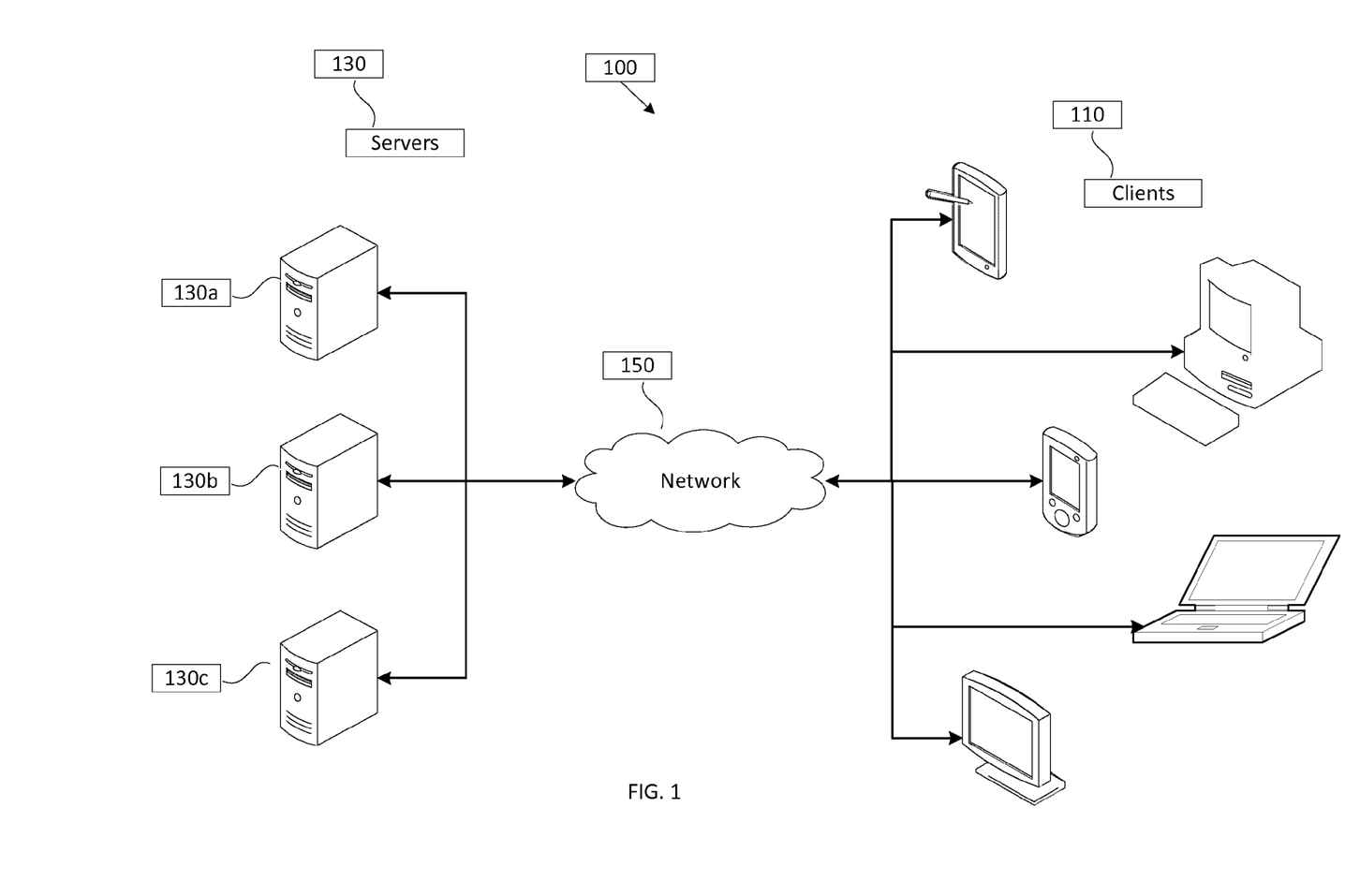
FIG. 1 illustrates an example architecture for probabilistically expediting secure connections via connection parameter reuse.

FIG. 1 illustrates an example architecture 100 for probabilistically expediting secure connections via connection parameter reuse. The architecture 100 includes servers 130 and clients 110 connected over a network 150.

In some embodiments, each of the many clients 110 is configured to include and execute an application for requesting or providing content. In some embodiments, a client may be a proxy server, and may respond to other client requests for content. The application can be, for example, a web browser, a video playing program, a document or text editing program, an image editing program, a video editing program, a gaming program, or any other program. The content can be, for example, a web page, a document, an image, a video, an audio file, a game, or other content.

The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities for requesting or displaying or providing content.

The servers 130 can be any device having an appropriate processor, memory, and communications capability for hosting the content. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
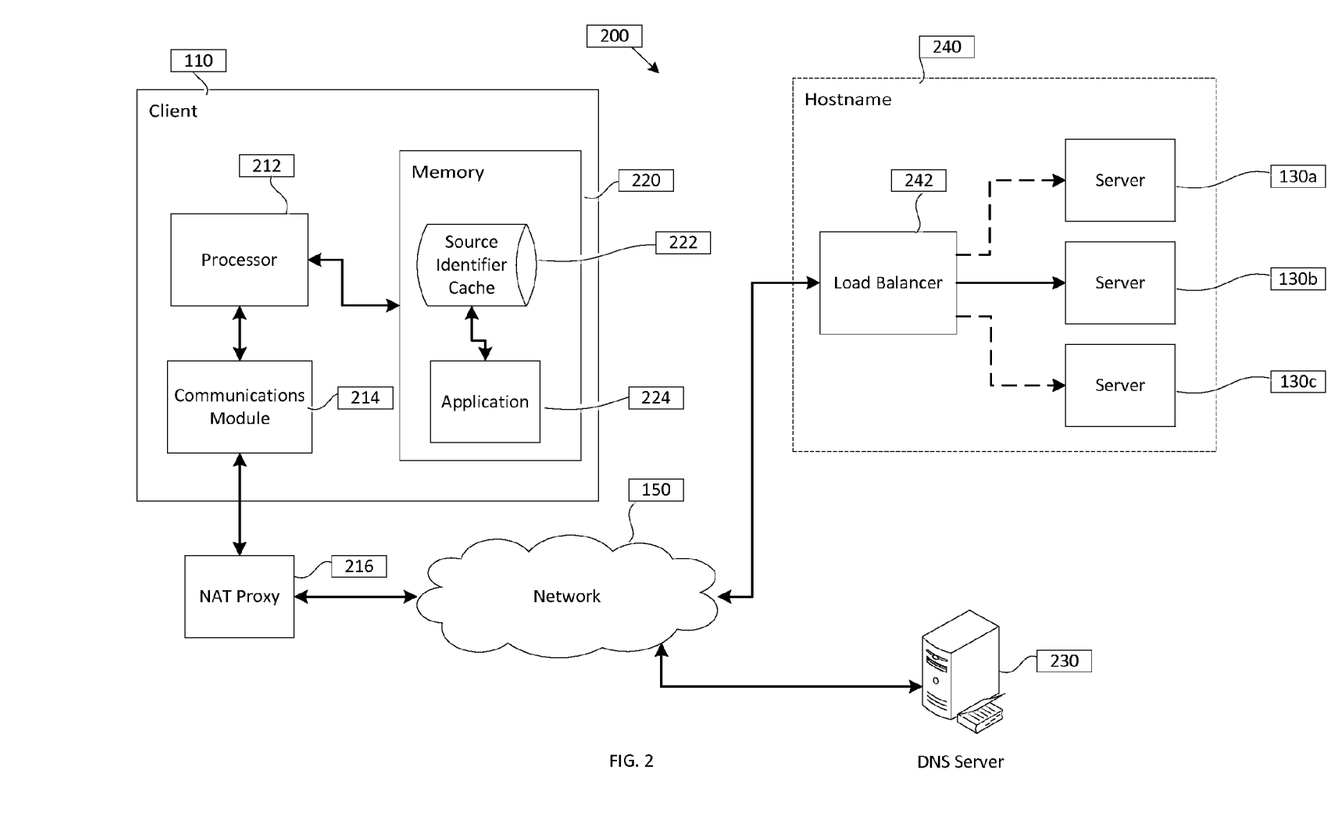
FIG. 2 is a block diagram illustrating an example client and server from the architecture of FIG. 1 according to certain aspects of the disclosure.

FIG. 2 is a block diagram 200 illustrating an example client 110 and servers 130a-c in the architecture 100 of FIG. 1 according to certain aspects of the disclosure. The client 110 and the server 130b are connected over the network 150.

The client 110 may include a processor 212, a communications module 214, and memory 220 that includes an application 224 and a source identifier cache 222 accessible by the application 224. The application 224 can be a web browser, a document or text editing program, an image editing program, a video editing program, a gaming program, or any other program. By way of non-limiting example, the content as discussed herein will be a web page, although other content can be used with the disclosed system, such as a document, an image, a video, an audio file, a game, or other content. The source identifier cache 222 stores hostnames and the source identifiers used to identify the client 110 when the client 110 makes a connection with the hostname 240. The communications module 214 is configured to interface with the network 150 to send and receive information, such as data, requests, responses, and commands to other devices on the network. The communications module 214 can be, for example, modems, WiFi interfaces, cellular/mobile radios, or Ethernet cards.

The Network Address Translation (NAT) proxy 216 translates the source information of a packet of data emitted from the client 110 to a more globally unique source identifier. For example, the source information of a packet of data emitted from the client 110 may be "10.1.2.3:8765." In that example, the information may be read as source IP address 10.1.2.3, with source port of 8765. This source identifier, or at least the port, may be randomly chosen. The NAT proxy 216 will translate this source information to make it more globally unique. For example, the NAT proxy 216 may translate "10.1.2.3:8765" to "4.8.15.16:2342."

The DNS server 230 provides mappings of hostnames to IP address sets. The client 110 requests DNS resolution of a hostname to the DNS server 230 and the DNS server 230 provides one or more IP addresses mapped to that hostname. For example, the hostname "example.com" may be mapped to the IP addresses "1.2.3.4" and "1.2.3.5." The hostname "anotherexample.com" may be mapped to the IP address "6.7.8.9." Once the DNS server 230 provides the client 110 the one or more IP addresses, the client 110 can use the one or more IP addresses to access the desired content.

The hostname 240 is the destination the client 110 connects to for content. The content of the hostname 240 is stored on the servers 130a-c. The load balancer 242 forwards packets of data sent to a hostname 240, to any one of the servers 130a-c. The load balancer 242 may select which server 130a-c should receive the connection by using a deterministic algorithm. Once the algorithm is run, the load balancer 242 forwards the packets of data to the chosen server (e.g., 130b in the example of FIG. 2, although 130a or 130c could have been chosen). The load balancer 242 may consistently forward packets of data from a particular client 110 to the same server 130b if the same source identifier is used. In order to establish a secure connection, the client 110 sends connection credentials to the server 130b.

For example, the processor 212 of the client 110 executes instructions to establish a secure connection to a hostname "example.com." The client 110 obtains the IP address of the hostname 240 from the DNS server 230. For example, the DNS server 230 can provide "1.2.3.4" as the IP address for "example.com." The client 110 then attempts to establish a connection to the hostname 240 "example.com" by sending packets of data to the hostname 240. The packets of data traverse the NAT proxy 216, where the source identifier of the packets of data is translated. The client 110 can have a local source identifier of "10.1.2.3:8765" and the NAT proxy 216 can translate the source identifier to a more globally unique source identifier, such as "4.8.15.16:2342." The packets of data, which now identify its source as "4.8.15.16:2342," travel across the network 150 to the load balancer 242. The load balancer 242 uses a deterministic algorithm to determine which server 130a-c to send the packets of data to. For example, the load balancer 242 can use a deterministic algorithm based on the source identifier of the packets of data, and the algorithm may result in the packets of data being sent to a particular server 130b. Because the algorithm is deterministic, if another packet of data contained the same source identifier "4.8.15.16:2342," that packet of data would again be sent to a particular server 130b. By contrast, if yet another packet of data contained a different source identifier "59.11.28.12:9551," the load balancer 242 may send that packet of data to another server 130a based on the results of the deterministic algorithm. After the client 110 has established a connection with a hostname 240, the client 110 then may save "example.com" and "4.8.15.16:2342" as a pair in the source identifier cache 222. Along with the hostname 240 and source identifier, the client 110 may also save the connection credentials in memory 220.

In certain aspects, when an application 224 makes a request to securely connect to a hostname 240, the client 110 will determine whether it had previously established a secure connection with the hostname 240. If the client 110 had previously established a secure connection with the hostname 240, then the client 110 obtains a source identifier used by the client 110 to establish the previous secure connection. The client 110 will look to the source identifier cache 222 to obtain the source identifier used in the previous secure connection. The client will send a connection request to the hostname 240. The source identification of the connection request may be translated by the NAT proxy 216. The connection request will travel across the network 150 and reach the load balancer 242. The load balancer 242 will use the same deterministic algorithm it used in the previous secure connection and assign the current connection request to the same server 130b as used before.

In certain aspects, the source identifier will comprise an IP address and a port number and the client 110 will send the request to securely connect to a hostname 240 using the previously used IP address and port number to identify the client 110.

In certain aspects, the source identifier comprises a Quick User Datagram Protocol Internet Connection (QUIC) identifier (a.k.a., GUID or Globally Unique Identifier). The client 110 will send the request to securely connect to a hostname 240 using some portion of a previously used QUIC identifier to identify the client 110.

In certain aspects, when the source identifier comprises a QUIC identifier, a QUIC identifier will comprise a first plurality of bits used to identify the client 110 and a second plurality of bits to identify a connection instance. The first plurality of bits used to identify the client 110 will be used as the source identifier.

In certain aspects, the client 110 will obtain the source identifier from the source identifier cache 222. The source identifier cache will store the source identifier used in previous secure connections based on the hostname 240.

In certain aspects, the server 130b may issue connection credentials to the client 110 when a secure connection is established. In order to initially establish a secure connection and issue connection credentials, additional exchanges of data between the client 110 and the server 130b may be required. Once a secure connection has been established, the client 110 may then store these issued connection credentials in memory 220. The connection credentials previously issued to the client 110 by the server 130b may be used at a later time, in order to establish a secure connection. If connection credentials are sent initially, while establishing connection to the server 130b, the secure connection can be established immediately, without requiring additional exchanges of data between the client 110 and the server 130b. In certain aspects, the connection credentials may be zero round-trip (0-RTT) connection credentials.

In certain aspects, the source identifier is generated by first generating a key. The key may be generated by combining an IP address of the hostname 240, the port number of the hostname 240, the name of the hostname 240, and a fixed seed. In other embodiments, the key may be generated using the port number of the hostname 240, the name of the hostname 240, and a fixed seed. In other embodiments, the key may be generated using any combination of information, as long as the same types of information are the same for every instance of generating a key. For example, if the IP address of the hostname 240 is "10.1.2.3," the port number of the hostname 240 is "8765," the name of the hostname 240 is "example.com" and the fixed seed is 41784, then the key generated could be "10.1.2.38765example.com41784."

In certain aspects, the client 110 performs a hash function on the key. In certain aspects, the hash function used to generate the source identifier is MD5. In certain aspects, the hash function is SHA-256. In other aspects, the hash function is any cryptographic or statistical hash function.

In certain aspects, the fixed seed is a randomly generated number associated with a web-browsing session. For example, the fixed seed may be randomly generated every time a web browser is run, and the same fixed seed may be used for the duration of the web-browsing session.

In certain aspects, the fixed seed is a randomly generated number associated with an installation of a web browser on a device. For example, the fixed seed may be randomly generated when the web browser is installed on a device, so the same fixed seed may be used for the duration of all web-browsing on the device, while performed using the web browser.

In certain aspects, the fixed seed is a randomly generated number associated with a profile for a browser session. For instance, within a browser session, there may be a plurality of effective users, such as the regular user, and the incognito user, and each effective user may be associated with a profile that contains a fixed seed. In certain aspects, such a fixed seed may be persisted and reused within new browser sessions when a profile is reused.

Figure 3A:
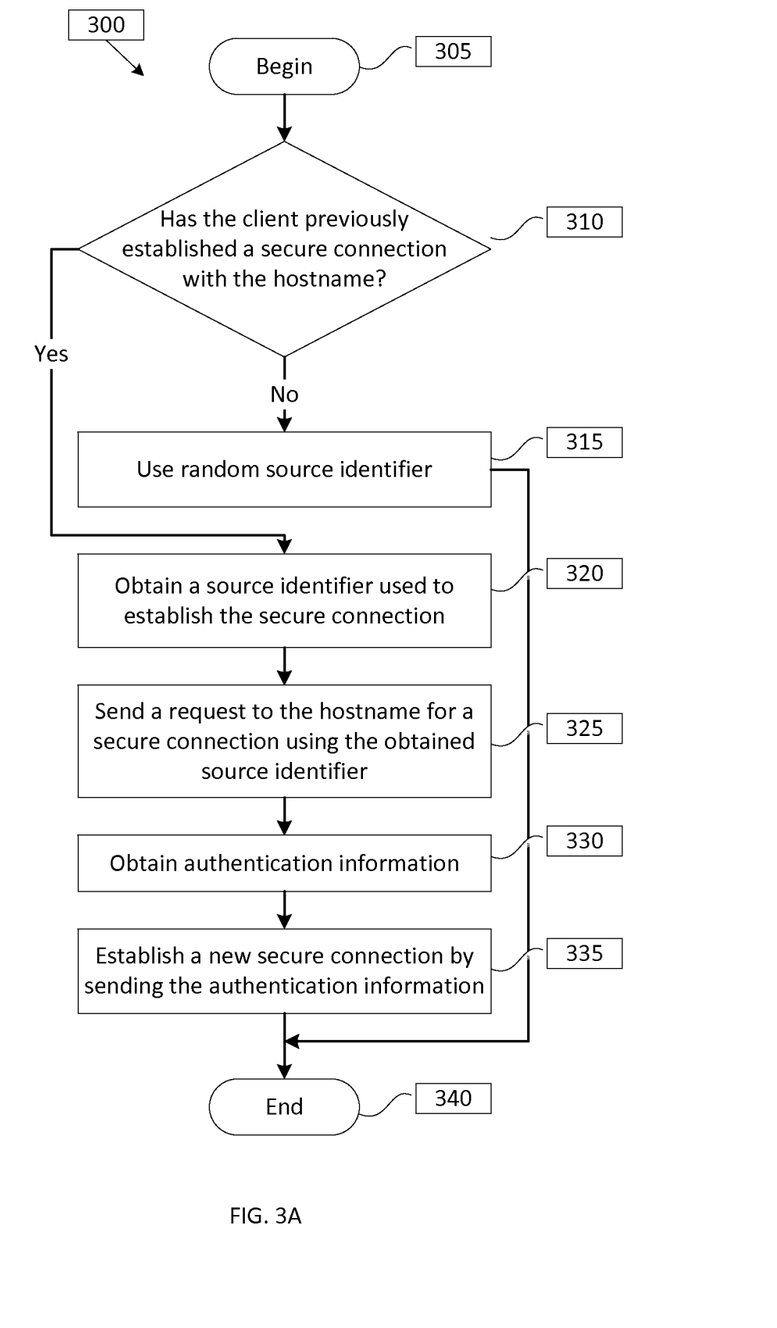
FIG. 3A illustrates an example process for probabilistically expediting secure connections via connection parameter reuse using the example client of FIG. 2.

FIG. 3A illustrates an example process 300 for probabilistically expediting secure connections via connection parameter reuse using the example client 110 of FIG. 2. While FIG. 3A is described with reference to FIG. 2, it should be noted that the process blocks of FIG. 3A may be performed by other systems.

The process 300 begins by proceeding from beginning block 305 to decision block 310. In decision block 310, a determination is made whether the client 110 previously established a secure connection with the hostname 240. If the determination of block 310 indicates that the client 110 has not previously established a secure connection with the hostname 240, then the process 300 proceeds to block 315 in which a random source identifier is used in connecting to the hostname 240.

If the determination of block 310 indicates that the client 110 has previously established a previous secure connection with the hostname 240, then the process 300 proceeds to block 320. In block 320, the client 110 obtains the source identifier (e.g., from the source identifier cache 222 of the client 110) used to establish the previous secure connection. The process 300 then proceeds to block 325 in which the client 110 sends a request to the hostname 240 for a new secure connection based on the obtained source identifier. The process 300 then proceeds to block 330 in which the client 110 obtains the secure connection parameters associated with the new connection. The process 300 then proceeds to block 335 in which the client 110 sends the request to the hostname 240 using the new secure connection, such as by using authentication and encryption established or proposed for the new secure connection. The process 300 then ends in block 340.

FIG. 3A sets forth an example process 300 for probabilistically expediting secure connections via connection parameter reuse using the example client 110 of FIG. 2. An example will now be described using the example process 300 of FIG. 3A, an application 224 that is a web browser, a client 110 that is a smartphone, and a hostname 240 that is example.com, which the client 110 has previously made a secure connection to, using the source identifier "4.8.15.16:2342."

The process 300 begins by proceeding from beginning block 305 to decision block 310 when the smartphone 110 determines if it had previously established a secure connection with example.com. Because the smartphone 110 had indeed previously established a previous secure connection with example.com, the determination of block 310 leads to block 320. In block 320, the smartphone 110 obtains the source identifier "4.8.15.16:2342" used to establish the previous secure connection to example.com. The process 300 proceeds to block 325 where the smartphone 110 sends a request to example.com for a new secure connection and uses the source identifier "4.8.15.16:2342." The process 300 then proceeds to block 330 when the smartphone 110 obtains the secure connection parameters associated with the new secure connection to example.com. The process 300 then proceeds to block 335 when the smartphone 110 sends the request to example.com using the new secure connection. The process 300 then ends in block 340.

Figure 3B:
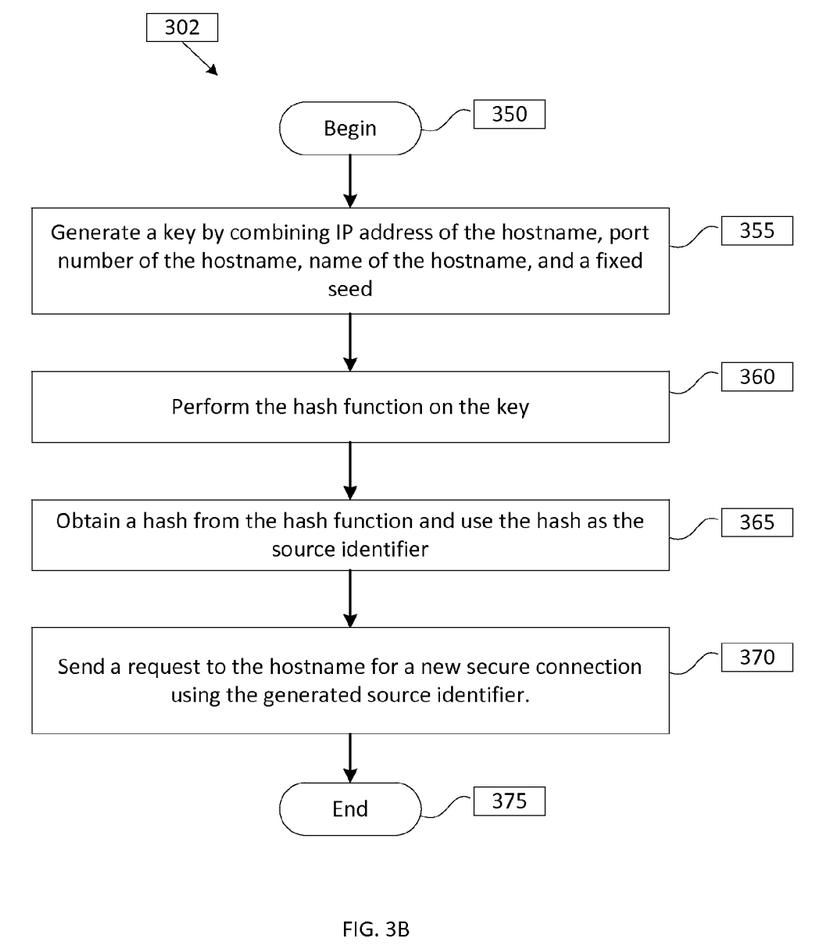
FIG. 3B illustrates an example process for probabilistically expediting secure connections via connection parameter reuse using the example client of FIG. 2.

FIG. 3B illustrates an example process 302 for probabilistically expediting secure connections via connection parameter reuse using the example client 110 of FIG. 2. While FIG. 3B is described with reference to FIG. 2, it should be noted that the process blocks of FIG. 3B may be performed by other systems.

The process 302 begins by proceeding from beginning block 350 to block 355. In block 355, the client 110 generates a key by combining IP address of the hostname 240, port number of the hostname 240, name of the hostname 240, and a fixed seed. The process 302 then moves to block 360, in which the client 110 performs the hash function on the key. The process 302 then moves to block 365, in which the client 110 obtains a hash from the hash function and uses the hash as the source identifier. The process 302 then moves to block 370, in which the client 110 sends a request to the hostname for a new secure connection using the generated source identifier. The process 302 then ends in block 375.

FIG. 3B sets forth an example process 300 for probabilistically expediting secure connections via connection parameter reuse using the example client 110 of FIG. 2. An example will now be described using the example process 300 of FIG. 3B, a hostname of "example.com," an IP address of example.com of "10.1.2.3," port number of example.com of "8765", a fixed seed of "170484," and a hash function of MD5.

The process 302 begins by proceeding from beginning block 350 to block 355. In block 355, the client 110 generates a key by combining IP address of example.com "10.1.2.3," port number of example.com of "8765," name of "example.com," and a fixed seed "170484." The process 302 then moves to block 360, in which the client 110 performs the MD5 hash function on the key. The process 302 then moves to block 365, in which the client 110 obtains a hash from the hash function MD5 and uses the hash as the source identifier. The process 302 then moves to block 370, in which the client 110 sends a request to the hostname for a new secure connection using the generated source identifier. The process 302 then ends in block 375.

Figure 4:
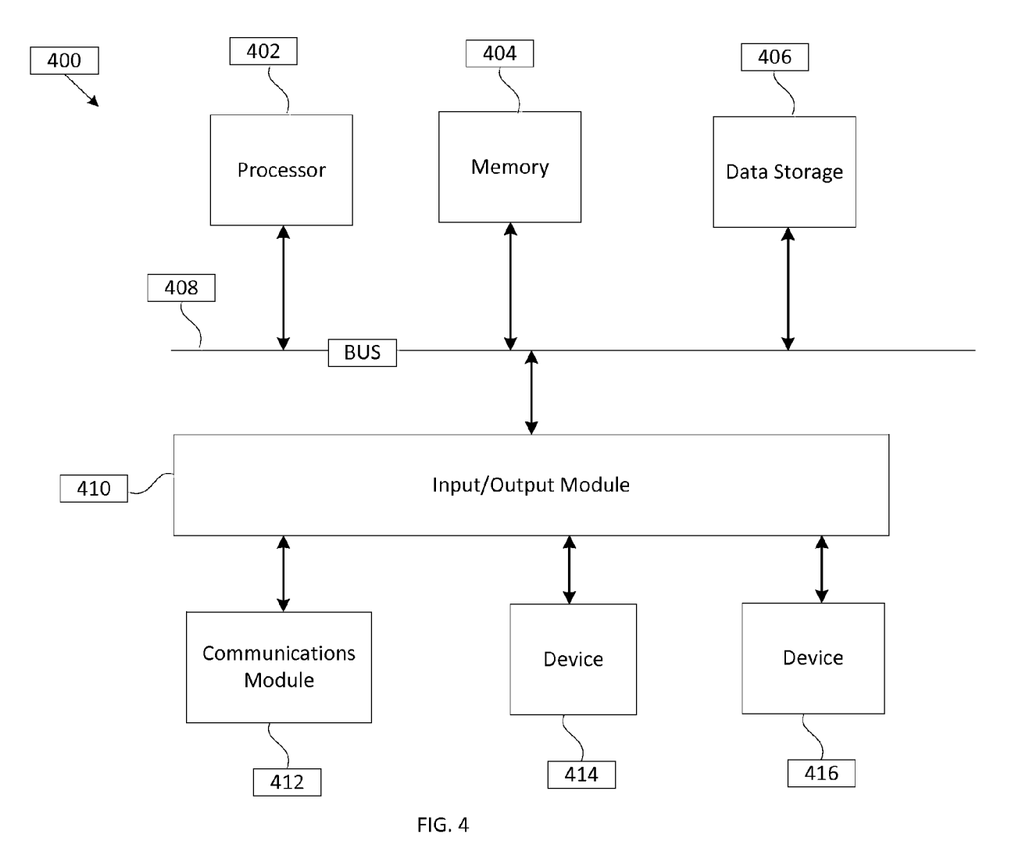
FIG. 4 is a block diagram illustrating an example computer system with which some implementation of the subject technology can be implemented.

FIG. 4 is a block diagram illustrating an example computer system 400 with which the client 110 and server 130 of FIG. 1 can be implemented. In certain aspects, the computer system 400 may be implemented using hardware or a combination of software and hardware, either in a dedicated server, or integrated into another entity, or distributed across multiple entities.

Computer system 400 (e.g., clients 110 and servers 130) includes a bus 408 or other communication mechanism for communicating information, and a processor 402 (e.g., processor 212) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 (e.g., communications module 214) include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
   determining that a client previously established a secure connection with a hostname;
   obtaining, in response to the determining, a source identifier used by the client to establish the previous secure connection, the source identifier comprising a Quick User Datagram Protocol Internet Connection (QUIC) identifier; and
   sending a request to the hostname for a new secure connection based on the obtained source identifier, the request being sent to the hostname using at least a portion of the QUIC identifier to identify the client.

2. The method of claim 1, wherein the source identifier comprises an IP address and a port number, and
   wherein sending the request comprises sending the request to the hostname using at least one of the IP address and the port number to identify the client.

3. The method of claim 2, wherein the IP address and the port number are a Network Address Translation of the IP address and the port number.

4. The method of claim 1, wherein the QUIC identifier comprises a first plurality of bits selected to identify the client and a second plurality of bits selected to identify a connection instance, and
   wherein obtaining the source identifier comprises obtaining the first plurality of bits of the QUIC identifier.

5. The method of claim 1, wherein obtaining the source identifier comprises looking up the source identifier in a locally-stored source identifier cache based on the hostname.

6. The method of claim 1, further comprising:
   obtaining connection credentials previously issued to the client by the hostname; and
   sending the connection credentials together with the request to the hostname for the new secure connection.

7. The method of claim 6, wherein the connection credentials comprise zero round-trip time (0-RTT) connection credentials.

8. A client system comprising:
   a memory storing executable instructions and a source identifier cache; and a processor configured to execute the executable instructions stored in the memory to:
  determine that a client system previously established a secure connection with a hostname;
  obtain, in response to the determining, a source identifier used by the client system to establish the previous secure connection from the source identifier cache, the source identifier comprising a Quick User Datagram Protocol Internet Connection (QUIC) identifier; and
  send a request to the hostname for a new secure connection based on the obtained source identifier, the request being sent to the hostname using at least a portion of the QUIC identifier to identify the client system.

9. The client system of claim 8, wherein the source identifier comprises an IP address and a port number, and
  wherein sending the request comprises sending the request to the hostname using at least one of the IP address and the port number to identify the client.

10. The client system of claim 8, wherein the QUIC identifier comprises a first plurality of bits selected to identify the client and a second plurality of bits selected to identify a connection instance, and
  wherein obtaining a source identifier comprises obtaining the first plurality of bits of the QUIC identifier.

11. The client system of claim 8, wherein the processor is further configured to execute the executable instructions stored in the memory to:
  obtain connection credentials previously issued to the client by the hostname; and
  send the connection credentials with the request to the hostname for the new secure connection.

12. The client system of claim 11, wherein the connection credentials comprise zero round trip time (0-RTT) connection credentials.

13. A non-transitory machine-readable medium embodying instructions that, when executed by a machine, allow the machine to perform a method comprising:
  generating a source identifier using a hash function, the source identifier comprising a Quick User Datagram Protocol Internet Connection (QUIC) identifier; and
  sending a request to a hostname for a new secure connection using the generated source identifier, the request being sent to the hostname using at least a portion of the QUIC identifier to identify a client associated with the source identifier.

14. The non-transitory machine-readable medium of claim 13, wherein generating the source identifier using a hash function comprises
  generating a key, wherein the key comprises a combination of: an IP address of the hostname, a port number of the hostname, a name of the hostname, and a fixed seed;
  performing the hash function on the key; and
  obtaining a hash from the hash function, wherein the generated source identifier is the hash.

15. The non-transitory machine-readable medium of claim 14, wherein the hash function is MD5.

16. The non-transitory machine-readable medium of claim 14, wherein the hash function is SHA-256.

17. The non-transitory machine-readable medium of claim 14, wherein the fixed seed is a randomly generated number associated with a web-browsing session.

18. The non-transitory machine-readable medium of claim 14, wherein the fixed seed is a randomly generated number associated with an installation of a web browser on a device.

* * * * *